US009665770B2

(12) United States Patent
Nanbu

(10) Patent No.: US 9,665,770 B2
(45) Date of Patent: May 30, 2017

(54) IMAGE PROCESSING APPARATUS WITH AN IMPROVED TABLE IMAGE DETECTING UNIT

(71) Applicant: KYOCERA Document Solutions Inc., Osaka (JP)

(72) Inventor: Sota Nanbu, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/074,814

(22) Filed: Mar. 18, 2016

(65) Prior Publication Data

US 2016/0283788 A1 Sep. 29, 2016

(30) Foreign Application Priority Data

Mar. 27, 2015 (JP) ................. 2015-065461

(51) Int. Cl.
*G06K 9/00* (2006.01)
*G06K 15/02* (2006.01)

(52) U.S. Cl.
CPC ....... *G06K 9/00463* (2013.01); *G06K 15/189* (2013.01); *G06K 15/1868* (2013.01); *G06K 15/1881* (2013.01)

(58) Field of Classification Search
CPC ............. H04N 1/00376; H04N 1/0036; G06K 9/00456
See application file for complete search history.

(56) References Cited

U.S. PATENT DOCUMENTS

2002/0106124 A1 8/2002 Wang

FOREIGN PATENT DOCUMENTS

JP 2000-200350 7/2000

*Primary Examiner* — Christopher D Wait

(57) ABSTRACT

An image processing apparatus includes an area extracting unit and a table image detecting unit. The area extracting unit is configured to extract a halftone dot area and character images in an image. The table image detecting unit is configured to detect the extracted halftone dot area as a table image if (a) the extracted halftone dot area includes no ruled lines and (b1) at least two of the detected character images are arranged in a primary scanning direction or a secondary scanning direction in the halftone dot area and (b2) character alignment of a tabular layout is detected on the character images on the basis of positional relations between divisional areas into which the halftone dot area is equally divided and the character images.

3 Claims, 3 Drawing Sheets

IMAGE PROCESSING APPARATUS WITH AN IMPROVED TABLE IMAGE DETECTING UNIT

CROSS-REFERENCE TO RELATED APPLICATIONS

This application relates to and claims priority rights from Japanese Patent Application No. 2015-065461, filed on Mar. 27, 2015, the entire disclosures of which are hereby incorporated by reference herein.

BACKGROUND

1. Field of the Present Disclosure

The present disclosure relates to an image processing apparatus.

2. Description of the Related Art

An image processing apparatus detects a frame and a dashed line in a raster image, presumes ruled lines from the detected frame and dashed line, and thereby determines whether the frame is a table image or not.

Meanwhile, there is a case that a table is expressed with no ruled lines. For example, a background color in a table is varied cell by cell, column by column or line by line, and consequently it is possible to express a table with no ruled lines. The background expressed in such manner is a solid image, but when printing such table, the background in the table is printed as halftone dots.

Therefore, when scanning an image of a printed matter that includes such table, the table appears as halftone dots in the scanned image. In addition, in such scanned image, a gradation image such as a photograph also appears as halftone dots.

In case of a table including a ruled line, a table image can be identified in the aforementioned technique on the basis of a ruled line in halftone dots in an image. However, in case of a table including no ruled lines, it is difficult to properly identify a table image from halftone dots in an image.

SUMMARY

An image processing apparatus according to an aspect of the present disclosure includes an area extracting unit and a table image detecting unit. The area extracting unit is configured to extract a halftone dot area and character images in an image. The table image detecting unit is configured to detect the extracted halftone dot area as a table image if (a) the extracted halftone dot area includes no ruled lines and (b1) at least two of the detected character images are arranged in a primary scanning direction or a secondary scanning direction in the halftone dot area and (b2) character alignment of a tabular layout is detected on the character images on the basis of positional relations between divisional areas into which the halftone dot area is equally divided and the character images.

These and other objects, features and advantages of the present disclosure will become more apparent upon reading of the following detailed description along with the accompanied drawings.

DETAILED DESCRIPTION

Hereinafter, an embodiment according to an aspect of the present disclose will be explained with reference to drawings.

Figure 1:
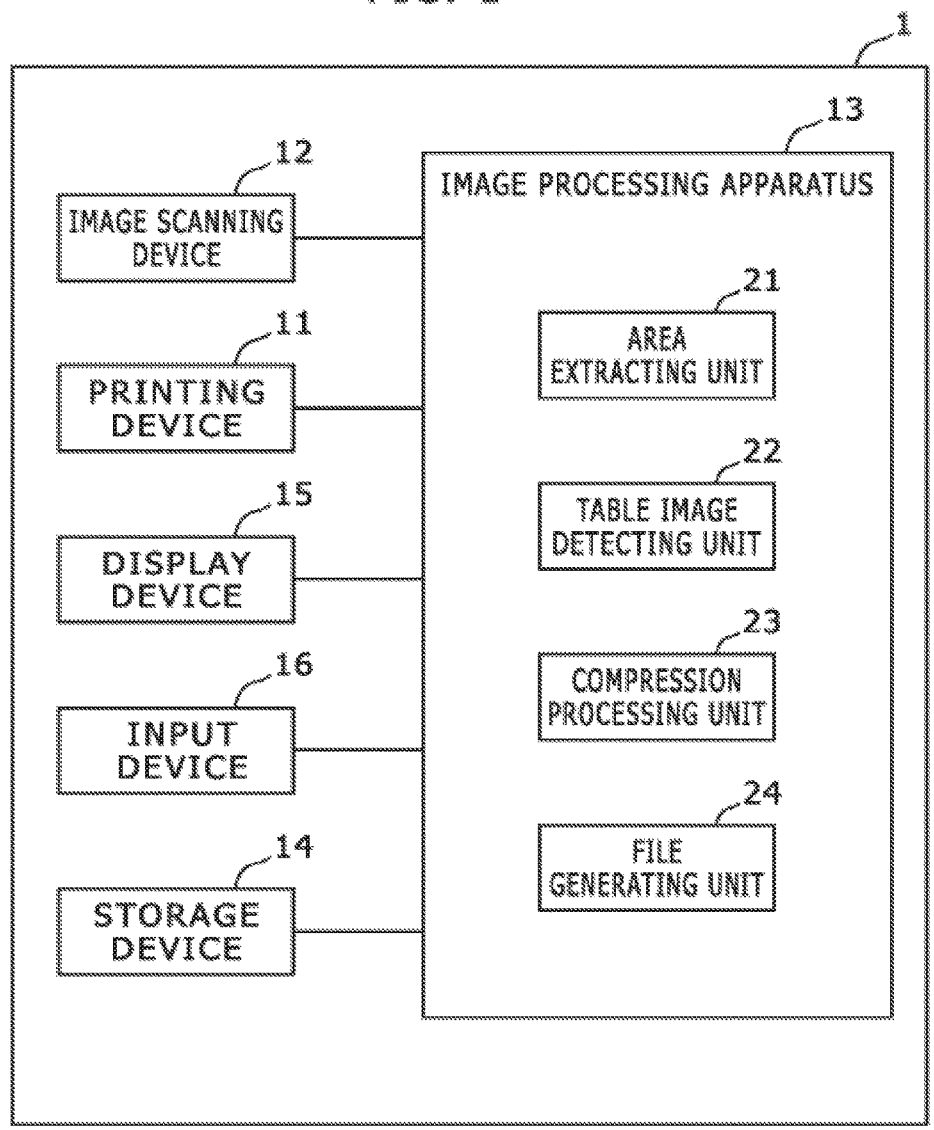
FIG. 1 shows a block diagram that indicates a configuration of an image forming apparatus that includes an image processing apparatus according to an embodiment of the present disclosure.

FIG. 1 shows a block diagram that indicates a configuration of an image forming apparatus that includes an image processing apparatus according to an embodiment of the present disclosure. The image forming apparatus 1 shown in FIG. 1 is a multi function peripheral, but may be a scanner, a copier or the like.

The image forming apparatus 1 includes a printing device 11, an image scanning device 12, an image processing apparatus 13, a storage device 14, a display device 15, and an input device 16.

The printing device 11 is an internal device as an example of an output device that prints a document image based on image data after sorts of image processing performed by the image processing apparatus 13 in an electrophotographic process using toner of CMYK (Cyan, Magenta, Yellow, and Black) colors.

Further, the image scanning device 12 is an internal device that optically scans a document image of a document and generates image data of the document image as RGB data.

Furthermore, the image processing apparatus 13 performs image processing such as color adjustment, color conversion and the like for image data such as the image data generated by the image scanning device 12. Furthermore, the storage device 14 is a non volatile rewritable storage device such as a flash memory and stores sorts of data and programs.

The image processing apparatus 13 is embodied with an ASIC (Application Specific Integrated Circuit), a computer or the like, and includes an area extracting unit 21, a table image detecting unit 22, a compression processing unit 23, and a file generating unit 24.

The area extracting unit 21 extracts a halftone dot area and character images in an image based on raster image data.

Regarding a halftone dot area, for example, the area extracting unit 21 detects a cyclic halftone dot pattern, detects an edge of the halftone dot pattern, and extracts the internal area from the edge as a halftone dot area. Regarding a character image, for example, the area extracting unit 21 extracts a character image using a labeling process.

The table image detecting unit 22 determines whether the extracted halftone dot area includes a ruled line or not, and detects the extracted halftone dot area as a table image if the extracted halftone dot area includes a ruled line.

If (a) the extracted halftone dot area includes no ruled lines, then the table image detecting unit 22 detects the extracted halftone dot area as a table image if (b1) at least two of the detected character images are arranged in a primary scanning direction or a secondary scanning direction in the halftone dot area and (b2) character alignment of a tabular layout is detected on the character images on the basis of positional relations between divisional areas into which the halftone dot area is equally divided and the character images.

Specifically, if at least two of the detected character images are arranged in a primary scanning direction in the halftone dot area, the table image detecting unit 22 detects the character alignment of the tabular layout on the character images on the basis of the positional relations between the divisional areas into which the halftone dot area is equally divided in the primary scanning direction and the character images.

In addition, if at least two of the detected character images are arranged in a secondary scanning direction in the halftone dot area, the table image detecting unit 22 detects the character alignment of the tabular layout on the character images on the basis of the positional relations between the divisional areas into which the halftone dot area is equally divided in the secondary scanning direction and the character images.

The compression processing unit 23 identifies other parts than the detected table image and the character images as a background image, and independently compresses the detected table image, the character images and the background image in a predetermined coding method. Image data of the background image is multi-bit data.

For example, the compression processing unit 23 independently compresses the detected table image, the character images and the background image in a JPEG (Joint Photographic Experts Group) method. In this process, the compression may be performed in respective different conditions (an image resolution, a coding method used for the compression, or the like) for the table image, the character images and the background image. For example, a loss-less method such as a GIF (Graphics Interchange Format) method or a PNG (Portable Network Graphics) method may be used as a coding method for the compression.

The file generating unit 24 generates an image file (e.g. a PDF (Portable Document Format) file) that includes the compressed table image, the compressed character images and the compressed background image in respective layers.

Figure 2:
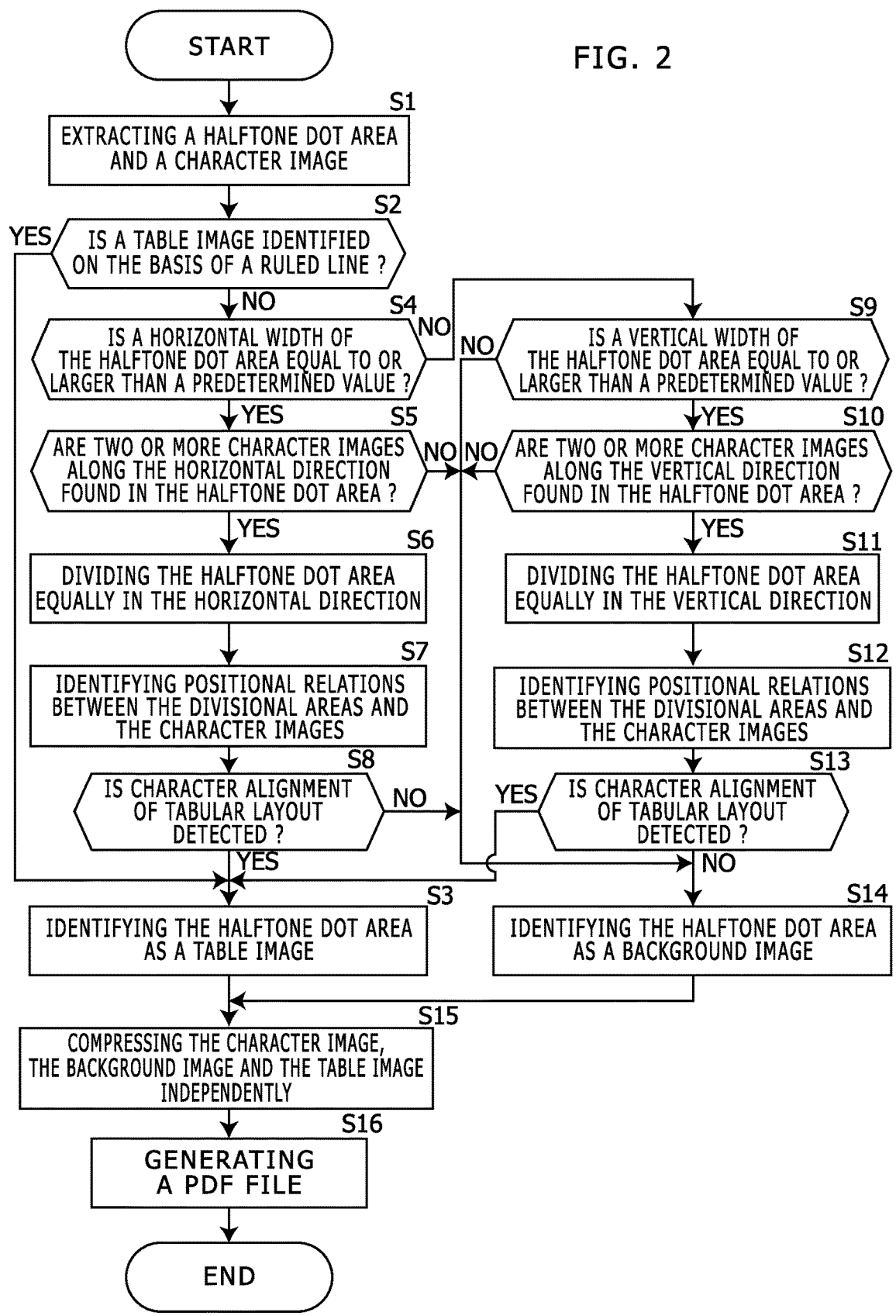
FIG. 2 shows a flowchart that explains a behavior of the image processing apparatus 13 shown in FIG. 1.
Figure 3:
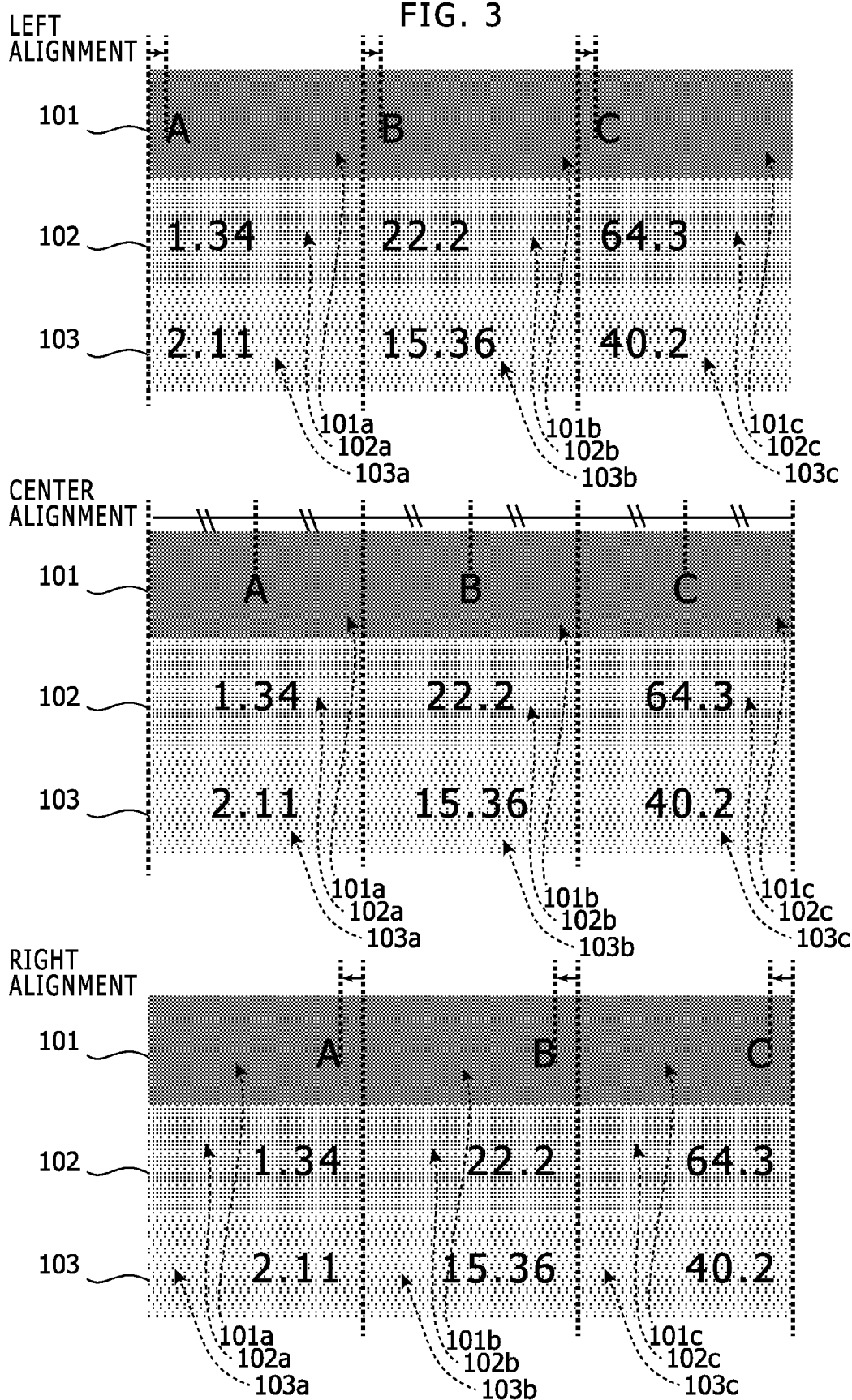
FIG. 3 shows a diagram that explains detection of character alignment in the image processing apparatus 13 shown in FIG. 1.

The following part explains a behavior of the aforementioned image processing apparatus 13. FIG. 2 shows a flowchart that explains a behavior of the image processing apparatus 13 shown in FIG. 1. FIG. 3 shows a diagram that explains detection of character alignment in the image processing apparatus 13 shown in FIG. 1.

Firstly the area extracting unit 21 extracts one or more halftone dots areas and one or more character images in an image based on raster image data (in Step S1).

Subsequently, the table image detecting unit 22 performs the following process for the detected halftone dot area and thereby determines whether the halftone dot area is a table image or not.

The table image detecting unit 22 determines whether the halftone dot area includes a ruled line or not (in Step S2). If the halftone dot area includes a ruled line, then the table image detecting unit 22 identifies the halftone dot area as a table image (in Step S3).

If the halftone dot area includes no ruled lines, then the table image detecting unit 22 determines whether the width of the halftone dot area is equal to or larger than a predetermined value in a primary scanning direction (hereinafter called "horizontal direction") or not (in Step S4).

If the width of the halftone dot area is equal to or larger than the predetermined value in the horizontal direction, then the table image detecting unit 22 determines whether plural character images are arranged in the horizontal direction in the extracted halftone dot area or not (in Step S5).

If plural character images are arranged in the horizontal direction in the extracted halftone dot area, then the table image detecting unit 22 equally divides the extracted halftone dot area into divisional areas in the horizontal direction so as to make the number of the divisional areas as same as the number of the character images extracted in this halftone dot area (in Step S6), and identifies positional relations between the divisional areas and the character images respectively (in Step S7).

Subsequently, on the basis of the identified positional relations, the table image detecting unit 22 determines whether character alignment of a tabular layout is detected in the halftone dot area or not (in Step S8).

For example, as shown in FIG. 3, in each of halftone dot areas 101 to 103 continuously arranged in the secondary scanning direction, when extracting three character images arranged in the horizontal direction, the halftone dot areas 101 to 103 are divided into three sets of three divisional areas 101a to 101c, 102a to 102c and 103a to 103c, respectively. If the character images are arranged as left alignment of a tabular layout, then (a) a distance between a left end of the divisional area 101a and a left end of a character image included in the divisional area 101a, (b) a distance between a left end of the divisional area 101b and a left end of a character image included in the divisional area 101b, and (c) a distance between a left end of the divisional area 101c and a left end of a character image included in the divisional area 101c should be substantially same as each other. Therefore, if (a) a distance between a left end of the divisional area 101a and a left end of a character image included in the divisional area 101a, (b) a distance between a left end of the divisional area 101b and a left end of a character image included in the divisional area 101b, and (c) a distance between a left end of the divisional area 101c and a left end of a character image included in the divisional area 101c are substantially same as each other, then it is determined that character alignment (here, left alignment) is detected in the halftone dot area 101.

Further, if (a) a distance between a center of the divisional area 101a and a center of a character image included in the divisional area 101a, (b) a distance between a center of the divisional area 101b and a center of a character image included in the divisional area 101b, and (c) a distance between a center of the divisional area 101c and a center of a character image included in the divisional area 101c are substantially same as each other, then it is determined that character alignment (here, center alignment) is detected in the halftone dot area 101.

Furthermore, if (a) a distance between a right end of the divisional area 101a and a right end of a character image included in the divisional area 101a, (b) a distance between a right end of the divisional area 101b and a right end of a character image included in the divisional area 101b, and (c) a distance between a right end of the divisional area 101c and a right end of a character image included in the divisional area 101c are substantially same as each other, then it is determined that character alignment (here, right alignment) is detected in the halftone dot area 101.

Thus, if character alignment of a tabular layout is detected in each of the halftone dot areas, then the table image detecting unit 22 identifies these plural halftone dot areas as a table image (in Step S3).

Contrarily, if the width of the extracted halftone dot area is neither equal to nor larger than the predetermined value in the horizontal direction (in Step S4), then the table image detecting unit 22 determines whether the width of the halftone dot area is equal to or larger than a predetermined value in a secondary scanning direction (hereinafter called "vertical direction") or not (in Step S9).

If the width of the halftone dot area is equal to or larger than the predetermined value in the vertical direction, then the table image detecting unit 22 determines whether plural character images are arranged in the vertical direction in the extracted halftone dot area or not (in Step S10).

If plural character images are arranged in the vertical direction in the extracted halftone dot area, then the table image detecting unit 22 equally divides the extracted halftone dot area into divisional areas in the vertical direction so as to make the number of the divisional areas as same as the number of the character images extracted in this halftone dot area (in Step S11), and identifies positional relations between the divisional areas and the character images respectively (in Step S12).

Subsequently, on the basis of the identified positional relations, the table image detecting unit 22 determines whether character alignment of a tabular layout is detected in the halftone dot area or not (in Step S13).

If the N character images arranged in the vertical direction are detected, then the halftone dot area is divided into the N divisional areas. If respective distances between top ends of the divisional areas and top ends of character images included in the respective divisional areas are substantially same as each other, then it is determined that character alignment (here, top alignment) is detected in the halftone dot area. Further, if respective distances between centers of the divisional areas and centers of character images included in the respective divisional areas are substantially same as each other, then it is determined that character alignment (here, center alignment) is detected in the halftone dot area. If respective distances between bottom ends of the divisional areas and bottom ends of character images included in the respective divisional areas are substantially same as each other, then it is determined that character alignment (here, bottom alignment) is detected in the halftone dot area.

Thus, if character alignment of a tabular layout is detected in each of the halftone dot areas, then the table image detecting unit 22 identifies these plural halftone dot areas as a table image (in Step S3).

Contrarily, (a) if in Step S9 it is determined that the width of the halftone dot area is neither equal to nor larger than the predetermined value in the vertical direction, (b) if in Step S5 it is determined that plural character images are not arranged in the horizontal direction, (c) if in Step S10 it is determined that plural character images are not arranged in the vertical direction, or (d) if in Step S8 or S13 the character alignment is not detected, then the table image detecting unit 22 determines that the extracted halftone dot area is not a table image (in Step S14).

In the aforementioned manner, after each halftone dot area falls into a table image or a background image, the compression processing unit 23 identifies other parts than the detected table image and the character images as a background image, and independently compresses the detected table image, the character images and the background image in a predetermined coding method (in Step S15).

Subsequently, the file generating unit 24 generates an image file (here a PDF file) that includes the compressed table image, the compressed character images and the compressed background image in respective layers (in Step S16).

In the aforementioned embodiment, if (a) the extracted halftone dot area includes no ruled lines, then the table image detecting unit 22 detects the extracted halftone dot area as a table image if (b1) at least two of the detected character images are arranged in a primary scanning direction or a secondary scanning direction in the halftone dot area and (b2) character alignment of a tabular layout is detected on the character images on the basis of positional relations between divisional areas into which the halftone dot area is equally divided and the character images.

Consequently, from the halftone dot area in an image, a table image including no ruled lines is properly identified.

Such halftone dot area in an image falls into a table image at higher probability and therefore the PDF file is generated with a higher compression ratio.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the halftone dot area is divided by the number of the character images and thereby the divisional areas are obtained (in Step S6 or S11). In a case that the character alignment was not detected using the divisional areas into which the halftone dot area is divided by the number (here called dividing number) of the character images, the dividing number may be increased and it may be tried again to detect the character alignment using divisional areas into which the halftone dot area is (equally) divided by the increased dividing number.

What is claimed is:

1. An image processing apparatus, comprising:
    an area extracting unit configured to extract a halftone dot area and character images in an image;
    a table image detecting unit configured to detect the extracted halftone dot area as a table image if (a) the extracted halftone dot area includes no ruled lines and (b1) at least two of the detected character images are arranged in a primary scanning direction or a secondary scanning direction in the halftone dot area and (b2) character alignment of a tabular layout is detected on the character images on the basis of positional relations between divisional areas into which the halftone dot area is equally divided and the character images;
    a compression processing unit configured to identify other parts than the detected table image and the character images as a background image, and independently compress the detected table image, the character images and the background image in a predetermined coding method; and
    a file generating unit configured to generate a file that includes the compressed table image, the compressed character images and the compressed background image in respective layers.

2. The image processing apparatus according to claim 1, wherein if at least two of the detected character images are arranged in a primary scanning direction in the halftone dot area, the table image detecting unit detects the character alignment of the tabular layout on the character images on the basis of the positional relations between the divisional areas into which the halftone dot area is equally divided in the primary scanning direction and the character images.

3. The image processing apparatus according to claim 1, wherein if at least two of the detected character images are arranged in a secondary scanning direction in the halftone dot area, the table image detecting unit detects the character alignment of the tabular layout on the character images on the basis of the positional relations between the divisional areas into which the halftone dot area is equally divided in the secondary scanning direction and the character images.

* * * * *